Jan. 7, 1958        O. C. HOLDERER        2,819,034
GATE VALVE
Filed June 3, 1955
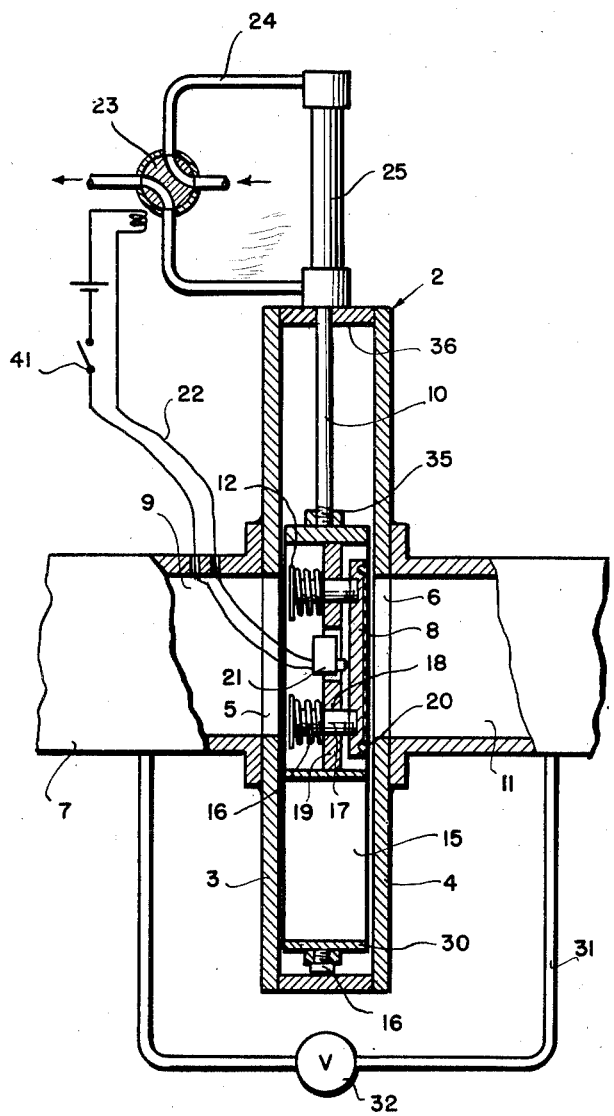
INVENTOR
OSCAR C. HOLDERER
BY W. E. Thibodeau, A. W. Dew
and R. F. Pippin, Jr.
ATTORNEYS

2,819,034

GATE VALVE

Oscar C. Holderer, Huntsville, Ala., assignor to the United States of America as represented by the Secretary of the Army Application June 3, 1955, Serial No. 513,173

8 Claims. (Cl. 251—29)

(Granted under Title 35, U. S. Code (1952), sec. 266)

This invention may be manufactured and used by or for the U. S. Government without the payment to me of any royalties thereon.

This invention relates to a gate valve arrangement for use in fluid flow lines in which a high differential pressure exists, such as in a wind tunnel, where in it is particularly useful as a downstream valve.

It is an object of this invention to provide an improved gate valve which will withstand high differential pressures, yet may be made of very light construction compared to prior gate valves for such use.

It is another object to provide a gate valve which will not open when other than substantially zero differential pressure exists across the valve.

It is still a further object to provide an improved gate valve which closes and opens easily under substantially zero differential pressure, yet cannot open or begin opening movement under greater differential pressures.

A still further object is to provide a gate valve in which the differential pressure across the valve seats and seals the valve in closed position.

Still a further object is to provide a gate valve in which the differential pressure across the valve seats and seals the valve in closed position and prevents actuation of the valve opening mechanism.

It is a still further object to provide a gate valve arrangement utilizing a differential pressure sensitive opening mechanism.

Still a further object is to provide a gate valve arrangement having a differential pressure sensitive opening mechanism and means for equalizing the pressures on each side of the valve to cause actuation of the opening mechanism.

Still other objects and many attendant advantages of the present invention will become readily apparent to one skilled in the art upon reading the following description of one preferred embodiment of my invention taken in conjunction with the accompanying drawing, wherein The figure illustrates in partial cross section a preferred embodiment of the invention.

A hollow boxlike fluid tight housing 2 having a pair of apertures 5 and 6 in the side plates 3 and 4 thereof is mounted in a fluid flow line 7. The apertures 5 and 6 are in registry with and correspond to the inner surface dimensions of the line 7.

A movable gate assembly is provided which is movable up and down within housing 2 to open and close the valve. In the open position the piston rod 10, to which is secured the gate assembly, is pulled to its uppermost position, whereupon window opening 15 is in registry with the inner flow surfaces of the line 7. This provides for smooth fluid flow, as no sharp breaks in the flow line are thus encountered. In the closed position the piston rod 10 is forced down until adjustable stop 16 comes into contact with the lower end of housing 2, at which time gate plate 8 is in registry with aperture 6.

With no pressure differential existing between the conduit interiors 9 and 11 on each side of the gate valve, the gate plate 8 is biased out of contact with the inner surface of side plate 4 by the action of a plurality of spaced apart coil springs 16 surrounding guide posts 17. The guide posts 17 are secured to the gate plate 8 and extend through and are slidably movable in openings 18 in the assembly connecting plate 19. The springs 16 surround the guide posts 17 and contact at one end a washer on the outer or free end of guide posts 17. At their other end the springs contact the connecting plate 19. In this laterally biased unseated position of gate plate 8 a suitable microswitch 21, mounted on connecting plate 19, is actuated for a purpose to be later described.

A small-mass-flow by-pass line 31, with associated by-pass valve 32, is provided in by-pass relation to the gate valve in order to equalize the pressure existing in the chambers 9 and 11 on both sides of the gate valve.

In operation, let it be assumed that the gate valve is in closed position, wherein adjustable stop 16 is in contact with the lower end of housing 2 and gate plate 8 is in registry with the aperture 6. With a pressure differential existing between chambers 9 (high pressure) and 11 (low pressure) it will be seen that the bias exerted on gate plate 8 by springs 16 is overcome by the fluid pressure differential, and the gate plate 8 will thus be securely forced into sealing position against the inner surface of the face plate 4, with a fluid tight seal being maintained through the use of a suitable gasket 20, such as the O-ring type, which may be secured in a groove on the contact surface of the gate plate 8.

In order to open the gate valve the by-pass valve 32 is first opened, permitting the pressure in chambers 9 and 11 to equalize. Upon the occurrence of pressure equalization, the springs 16 will bias the gate plate 8 out of contact with side plate 4 and into contact with microswitch 21, thereby actuating this switch. Microswitch 21 is suitably connected through leads 22 to a suitable 4-way solenoid valve 23 in the hydraulic control line 24 for cylinder 25 in which the piston (not shown), secured to or integral with piston rod 10, moves. Actuation of the microswitch 21 by the pressure of gate plate 8 thereupon causes the valve 23 to be moved to a second position such that fluid under pressure from a suitable fluid supply source (not shown) is forced into the lower end of cylinder 25 and out of the upper end of cylinder 25 through line 24. Thus the piston (not shown) and associated piston rod 10 is caused to move upward until the upper adjustable stop 35 comes into contact with the upper end 36 of the housing 2. In both the upper and lower positions of the gate the pressure in line 24 is maintained to keep the valve securely in such position. In this upper position, it will be seen, as described supra, that the gate or window opening 15 is in registry with the inner surfaces of chambers 9 and 11 and thus establishes a substantially continuous passage for fluid flow therethrough. It will also be noted, and such is an important aspect of this invention, that the valve assembly including gate plate 8 does not begin its movement to open position until the gate plate 8 is out of contact with the face plate 4. It is also an important aspect that such action will not occur until the pressure on both sides of the gate valve is substantially equalized.

To close the gate valve, the switch 41 is opened, breaking the circuit to solenoid valve 23 and thus causing reversal of flow in the hydraulic control line 24. Thus the piston and associated piston rod 10 are moved downwardly together with the gate assembly, including gate plate 8 and lower window assembly 30, until the lower adjustable stop 16 comes into contact with the lower end of housing 2. This movement, as well as the upward opening movement previously described, is accomplished with the differential pressure across the gate valve being zero or substantially zero. After the movable valve assembly reaches its lower position with gate plate 8 in registry with the aperture 6, the by-pass valve 32 is closed and a pressure differential is then applied across the gate valve as by applying pressure to chamber 9 and/or by creating a vacuum in chamber 11. This pressure differential effectively seats the gate plate 8, with its associated gasket seal, against the inner surface of side plate 4, thereby providing a highly effective pressurized seal between the chambers 9 and 11.

The usefulness of this valve can be better understood by the following examples. Suppose that within a fluid circuit there is a section which may require frequent access, as for instance the changing of catalysers (in the chemical industry). This section is built between two valves for servicing of the catalysers. In this case one of these two valves can be of the above description with its characteristic feature of light weight construction and positive sealing.

In the use of this valve in a wind tunnel this valve construction is particularly advantageous as the downstream valve, with a suitable valve as the upstream valve which may be moved under high pressure differential. Thus zero pressure differential may be easily accomplished across the valve of the present invention for opening and closing thereof, with the other mentioned upstream valve serving to maintain pressure differential between a pressure source and the conduit line leading to the "high pressure" side of the valve of the instant invention.

It will be obvious to one skilled in the art that while I have shown one preferred embodiment of my invention, such is for illustrative purposes only and is not to be interpreted as limiting the scope of the invention.

Many other alternative arrangements within the scope of my invention might be employed by one skilled in the art, and the scope of my invention is thus understood to be limited only by the scope of the appended claims.

I claim:

1. A gate valve comprising a rectilinearly movable gate having a laterally movable seatable gate plate, means normally biasing said gate plate to unseated position, said gate having a window assembly therein spaced from said gate plate, and means responsive to the unseated position of said gate plate for moving said gate to and from first and second positions, said gate plate being positioned for registry with and restriction of the interior of a conduit in said first position and said window assembly being positioned for registry with the internal surfaces of said conduit in said second position.

2. A gate valve comprising a rectilinearly movable gate having a laterally movable seatable gate plate, means normally biasing said gate plate to unseated position, said gate having a window assembly therein spaced from said gate plate, and means for moving said gate to and from first and second positions, said gate plate being positioned for registry with and restriction of the interior of a conduit in said first position and said window assembly being positioned for registry with the internal surfaces of said conduit in said second position, and means responsive to the lateral unseated position of said gate plate operative to move said gate from said first position to said second position.

3. A gate valve comprising a rectilinearly movable gate having a laterally movable seatable gate plate, means normally biasing said gate plate to unseated position, said gate having a window assembly therein spaced from said gate plate, and means for moving said gate to and from first and second positions, said gate plate being positioned for registry with and restriction of the interior of a conduit in said first position and said window assembly being positioned for registry with the internal surfaces of said conduit in said second position, and electrical means responsive to the lateral unseated position of said gate plate operative to initiate movement of said gate from said first position to said second position.

4. A gate valve comprising a rectilinearly movable gate having a laterally movable seatable gate plate, resilient means normally biasing said gate plate to unseated position, said gate having a window assembly therein spaced from said gate plate, and means for moving said gate to and from first and second positions, said gate plate being positioned for registry with and restriction of a conduit in first position and said window assembly being positioned for registry with the internal surfaces of said conduit in said second position, and electrical means responsive to the lateral unseated position of said gate plate operative to initiate movement of said gate from said first position to said second position.

5. A gate valve comprising a rectilinearly movable gate having a laterally movable seatable gate plate, spring means normally biasing said gate plate to unseated position, said gate having a window assembly therein spaced from said gate plate, and means for moving said gate to and from first and second positions, said gate plate being positioned for registry with and restriction of a conduit in first position and said window assembly being positioned for registry with the internal surfaces of said conduit in said second position, and electrical means responsive to the lateral unseated position of said gate plate operative to initiate movement of said gate from said first position to said second position.

6. A gate valve comprising a movable gate, said gate having a seatable gate plate movable over a restricted distance at an angle to the normal line of movement of the gate, said gate plate seatable by differential pressure across said gate, means responsive to substantially zero pressure across said gate to bias said gate plate to unseated position, and means responsive to the unseated position of said gate plate operative to move said gate.

7. A gate valve comprising a rectilinearly movable gate assembly, said gate assembly having a seatable gate plate, said gate plate being movable over a restricted distance relative to a part of said gate assembly at an angle to the normal line of movement of the gate assembly, said gate plate seatable by differential pressure across said gate assembly, means responsive to substantially zero pressure across said gate assembly to bias said gate plate to unseated position, and means responsive to the unseated position of said gate plate operative to move said gate assembly along its normal line of movement.

8. A gate valve comprising: in combination, a rectinearly movable gate having an integral two-section assembly consisting of; a window section being separated from a gate plate section by a fluid tight dividing plate and having inlet and outlet ports positioned for registry with the internal surfaces of a conduit, and a gate plate section having a connecting plate secured to said section dividing plate and to a head plate of the gate plate section, said connecting plate extending along the longitudinal axis of the gate plate section and having a plurality of spaced apart apertures, a plurality of guide posts in registry with the plurality of connecting plate apertures and which extend through and are slideably movable in said plurality of connecting plate apertures, each of said plurality of guide posts secured at one end to a laterally movable seatable gate plate which is in spaced relation with and parallel to said connecting plate, spring means in contact relation with the side of said connecting plate opposite said gate plate and surrounding the extensions of each of the plurality of said guide posts, the other ends of said spring means in contact with stop means secured to said plurality of guide posts, said spring means normally biasing said gate plate to unseated position when substantially zero pressure exists across said gate plate, and means responsive to the lateral unseated position of said gate plate operative to move said gate.

References Cited in the file of this patent

UNITED STATES PATENTS

| | | |
|---|---|---|
| 191,078 | Scovell | May 22, 1877 |
| 824,681 | Ashley | June 26, 1906 |
| 1,958,262 | Boland | May 8, 1934 |
| 2,214,195 | Frankley | Sept. 10, 1940 |
| 2,520,893 | Stevenson | Aug. 29, 1950 |
| 2,668,685 | Ocker | Feb. 9, 1954 |
| 2,698,516 | Hjulian | Jan. 4, 1955 |
| 2,707,483 | Shafer | May 3, 1955 |